United States Patent
Sai

(10) Patent No.: US 10,296,011 B2
(45) Date of Patent: May 21, 2019

(54) VEHICLE-MOUNTED MILLIMETER-WAVE COMMUNICATION DEVICE AND COMMUNICATION METHOD

(71) Applicant: TOYOTA JIDOSHA KABUSHIKI KAISHA, Toyota-shi, Aichi-ken (JP)

(72) Inventor: Seii Sai, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/914,952

(22) Filed: Mar. 7, 2018

(65) Prior Publication Data

US 2018/0284804 A1 Oct. 4, 2018

(30) Foreign Application Priority Data

Mar. 30, 2017 (JP) ................. 2017-067682

(51) Int. Cl.
*G08G 1/00* (2006.01)
*G05D 1/02* (2006.01)
(Continued)

(52) U.S. Cl.
CPC ......... *G05D 1/0257* (2013.01); *G05D 1/0055* (2013.01); *H01Q 1/3275* (2013.01); *H01Q 1/3283* (2013.01); *H01Q 3/24* (2013.01); *H04B 7/005* (2013.01); *H04W 4/40* (2018.02); *H04W 4/70* (2018.02)

(58) Field of Classification Search
CPC ..... G05D 1/0257; G05D 1/0055; H04W 4/70; H04W 4/40; H04B 7/005; H01Q 1/3275; H01Q 3/24; H01Q 1/3283

USPC ........ 340/902, 903, 905; 342/374, 368, 147, 342/175; 455/277.1, 277.2
See application file for complete search history.

(56) References Cited

U.S. PATENT DOCUMENTS 5,917,442 A * 6/1999 Manoogian ............. F41G 7/008
244/3.14
7,751,945 B2 * 7/2010 Obata .................... G08G 1/161
340/902

(Continued)

FOREIGN PATENT DOCUMENTS

| JP | 2001-036444 A | 2/2001 |
| JP | 2004-214864 A | 7/2004 |
| KR | 10-1709076 B1 | 2/2017 |

*Primary Examiner* — Anh V La
(74) *Attorney, Agent, or Firm* — Oliff PLC

(57) ABSTRACT

A vehicle-mounted millimeter-wave communication device for performing communication while temporally changing a communication direction by using an antenna unit capable of changing directivity includes: a detection unit configured to detect a direction of a communication partner present around a host vehicle; and a communication control unit configured to perform control such that communication is performed, in which a longer communication time is set for the direction of the communication partner than another direction. The communication control unit preferably performs control that sets a long communication time for the direction of the communication partner in the case where the type of the content of communication with the communication partner is related to control of a vehicle, and in the case where the volume of the communication with the communication partner is not less than a threshold value.

12 Claims, 10 Drawing Sheets

(51) Int. Cl.
    *H04W 4/70*     (2018.01)
    *H04B 7/005*     (2006.01)
    *G05D 1/00*     (2006.01)
    *H01Q 1/32*     (2006.01)
    *H01Q 3/24*     (2006.01)
    *H04W 4/40*     (2018.01)

(56) References Cited

U.S. PATENT DOCUMENTS

| | | | |
|---|---|---|---|
| 2006/0158369 A1* | 7/2006 | Shinoda | G01S 7/2925 342/70 |
| 2007/0096885 A1* | 5/2007 | Cheng | B60W 40/04 340/435 |
| 2010/0045481 A1* | 2/2010 | Tengler | G08G 1/20 340/902 |
| 2011/0068949 A1* | 3/2011 | Ieda | G08G 1/0965 340/902 |
| 2011/0205969 A1 | 8/2011 | Ahmad et al. | |
| 2012/0068878 A1* | 3/2012 | Billaud | G01S 7/034 342/37 |
| 2016/0277911 A1 | 9/2016 | Kang et al. | |
| 2016/0334501 A1 | 11/2016 | Ling | |
| 2017/0149130 A1 | 5/2017 | Kim | |

\* cited by examiner

FIG 2A EXTERNAL VIEW OF ANTENNA
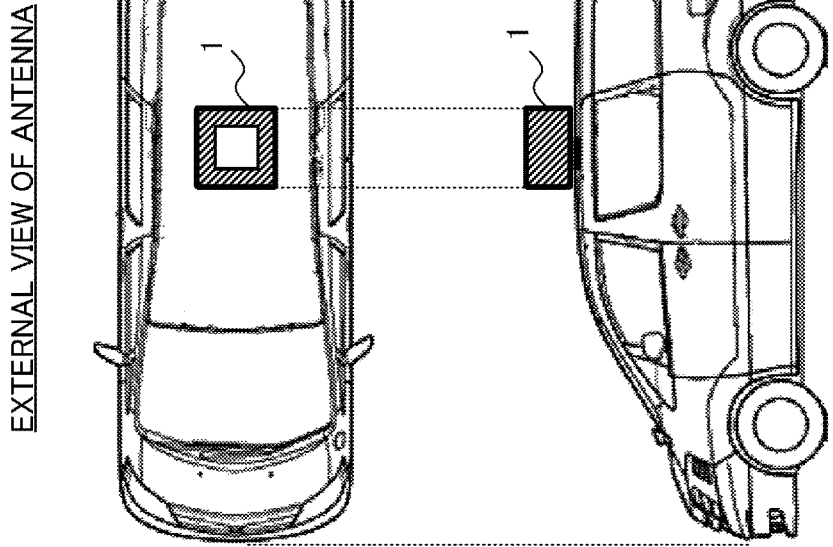
FIG 2B CONFIGURATION DIAGRAM
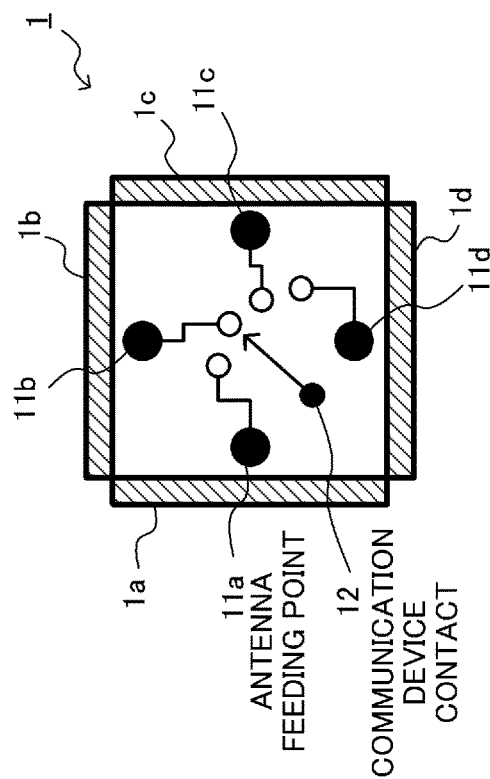
FIG 2C MODIFICATION
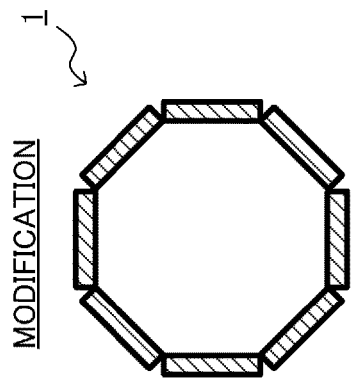

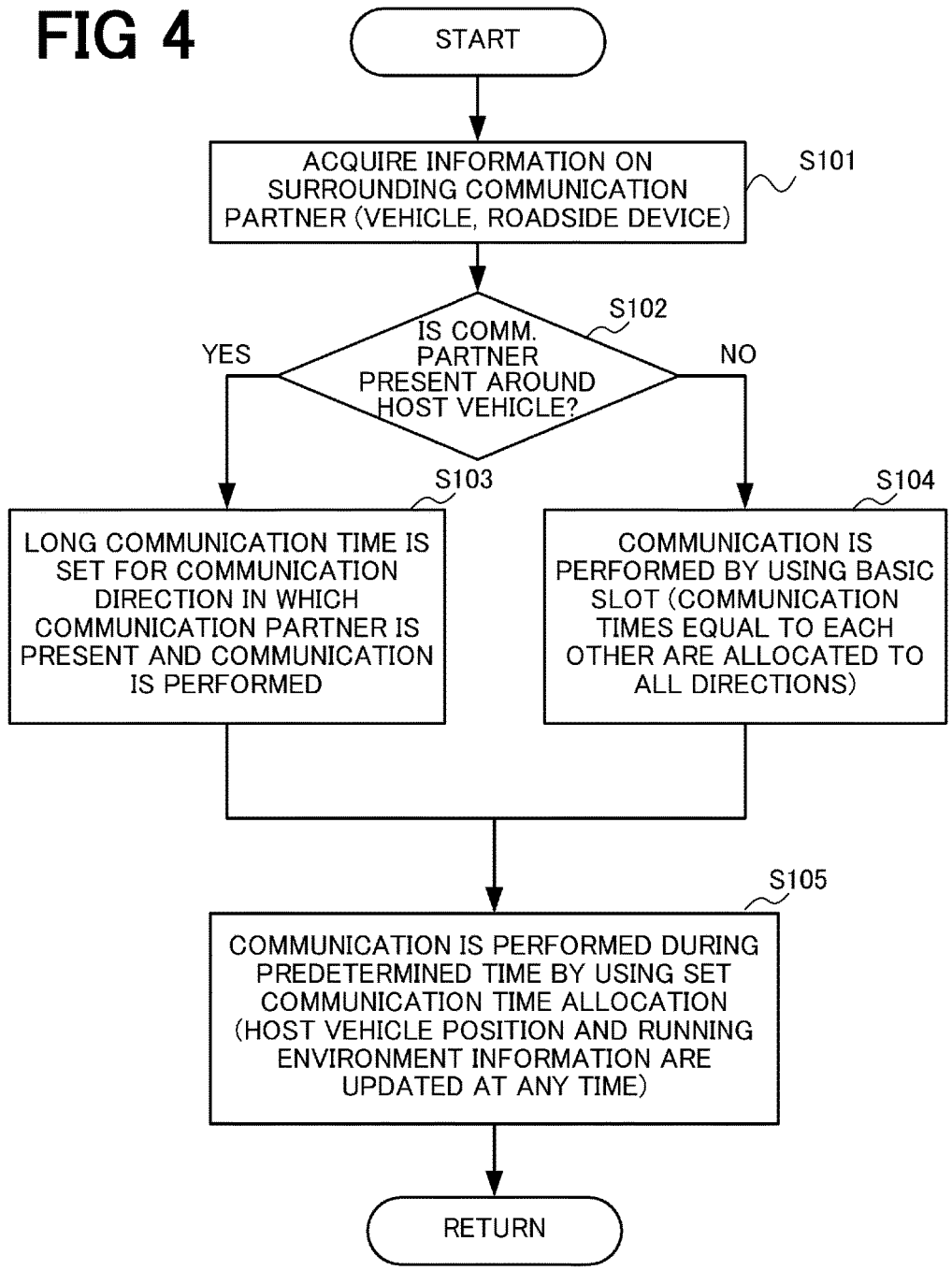

LONG COMMUNICATION TIMES ARE ALLOCATED TO FORWARD AND BACKWARD DIRECTIONS

LONG COMMUNICATION TIME IS ALLOCATED TO FORWARD DIRECTION

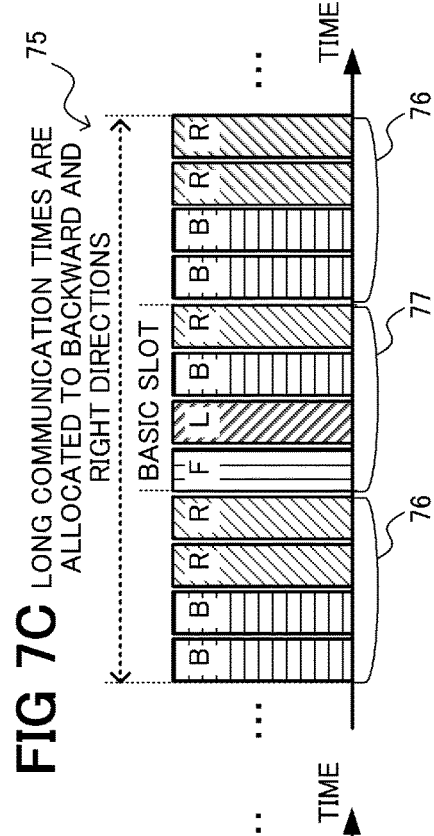
FIG 7A  LONG COMMUNICATION TIME IS ALLOCATED TO LEFT DIRECTION
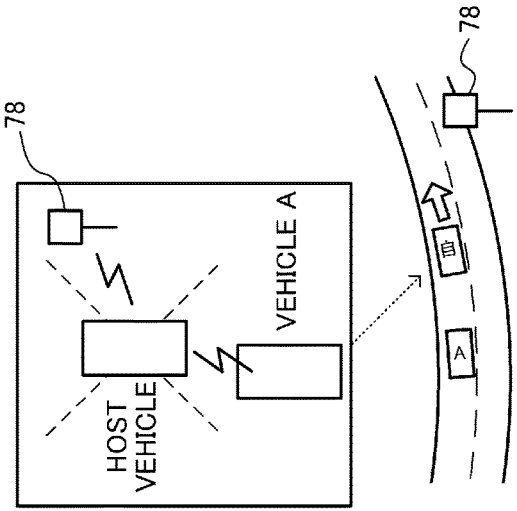
FIG 7C  LONG COMMUNICATION TIMES ARE ALLOCATED TO BACKWARD AND RIGHT DIRECTIONS
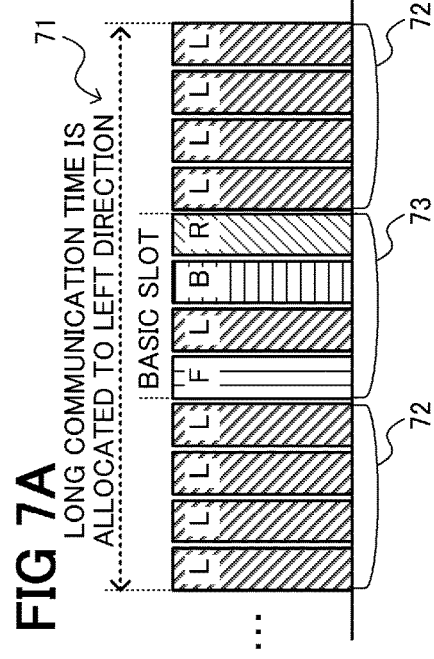
FIG 7B
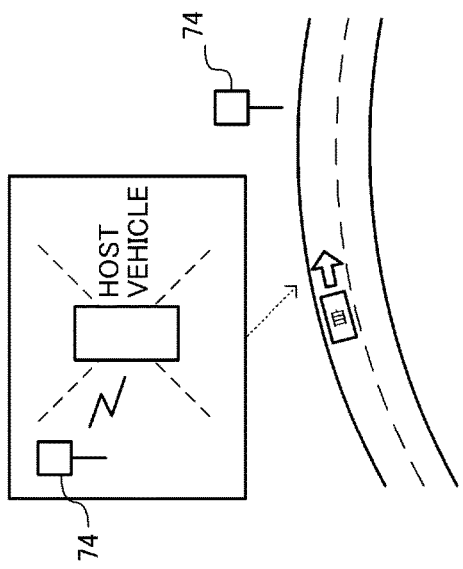
FIG 7D

VEHICLE-MOUNTED MILLIMETER-WAVE COMMUNICATION DEVICE AND COMMUNICATION METHOD

BACKGROUND OF THE INVENTION

Field of the Invention

The present invention relates to millimeter wave communication, and more particularly relates to communication control that enables efficient communication in roadside-to-vehicle and vehicle-to-vehicle communication.

Description of the Related Art

The use of millimeter waves (a band from 24 GHz to 86 GHz) is proposed to implement high-capacity communication in the next generation mobile communication system (5G). The millimeter wave has high straightness, and hence it is necessary to appropriately adjust a communication direction (directivity) to perform communication.

Japanese Patent Application Publication No. 2004-214864 (PTL1) describes a technique related to a communication antenna for a wireless LAN in a 2.4 GHz or 5.8 GHz band, and discloses that communication quality is maintained by changing the directivity of the antenna depending on the situation. Specifically, PTL1 discloses that communication with a communication partner is allowed with high quality by adjusting the directivity of the antenna even in the case where an obstacle is present.

Japanese Patent Application Publication No. 2001-36444 (PTL2) discloses that, to overcome a problem that received power attenuates due to interference between a direct wave and a reflected wave reflected by a road surface, a plurality of antennas are installed such that the heights of the antennas from the ground are different from each other.

In roadside-to-vehicle and vehicle-to-vehicle communication, the position of a communication partner to which radio waves are to be transmitted or from which radio waves are to be received changes depending on the situation. In conventional arts, communication with a fixed specific communication partner is considered, or the transmission direction of the antenna is fixed, and hence it is not possible to change the communication direction depending on the situation.

Patent Literature 1 (PTL1): Japanese Patent Application Publication No. 2004-214864

Patent Literature 2 (PTL2): Japanese Patent Application Publication No. 2001-36444

SUMMARY OF THE INVENTION

An object of the present invention is to implement efficient millimeter wave communication in a vehicle.

A first aspect of the present invention is a vehicle-mounted millimeter-wave communication device for performing communication while temporally changing a communication direction by using an antenna unit capable of changing directivity, the communication device including: a detection unit configured to detect a direction of a communication partner present around a host vehicle, wherein the direction is a direction from the host vehicle; and a communication control unit configured to perform control such that communication is performed, in which a longer communication time set for the direction of the communication partner than another direction.

Thus, it is possible to perform communication having a larger communication volume with a known communication partner in a short time by setting the long communication time for the direction in which the communication partner is present, and it is possible to keep communication with the other communication partners (e.g., new communication partners) by setting the communication times for the other directions.

The vehicle-mounted millimeter-wave communication device according to the present aspect may further include a communication type acquisition unit configured to acquire a type of a content of communication with the communication partner, and the communication control unit may perform control that sets a long communication time for the direction of the communication partner in a case where the type of the content of the communication with the communication partner is related to control of a vehicle. Alternatively, the vehicle-mounted millimeter-wave communication device according to the present aspect may further include a communication volume acquisition unit configured to acquire a volume of communication with the communication partner, and the communication control unit may perform control that sets a long communication time for the direction of the communication partner in a case where the volume of the communication with the communication partner is not less than a threshold value.

According to this configuration, it is possible to allocate many communication resources to the communication partner that performs the communication related to the control of the vehicle or the communication partner that needs to perform large-volume communication, i.e., the communication partner having higher necessity instead of setting long communication time for all communication partners. Note that the communication control unit may determine the allocation of the communication time using both of the communication content and the communication volume.

In addition, the communication control unit in the present aspect may perform control such that communication, in which a long communication time is set for the direction of the communication partner, and communication, in which equal communication times are set for all directions are performed alternately in a case where the communication partner is present around the host vehicle. The communication control unit may use the two types of the communication modes at an equal time ratio or may use one of the communication modes at a higher ratio.

According to this configuration, it is possible to allocate many communication resources to the communication partner to perform communication having a larger communication volume in a short time, and keep communication with the communication partners present in the other directions.

As an antenna unit in the present aspect, it is possible to use, e.g., a plurality of fixed antennas directed in different directions. Although the directivity of each fixed antenna cannot be adjusted, the communication control unit can adjust the directivity by selecting the antenna to be used, and can change the setting of the communication time of each direction by adjusting a time period during which each fixed antenna is selected.

As another example of the antenna unit in the present aspect, it is possible to use a rotary antenna. The communication control unit can adjust the directivity by rotating the antenna, and can change the setting of the communication time of each direction by adjusting a rotation speed at each angle (orientation).

As still another example of the antenna unit in the present aspect, it is also possible to use an array antenna having multiple elements. The communication control unit can adjust the directivity by beamforming, and can change the setting of the communication time of each direction by adjusting the directivity and the direction of the directivity.

The detection unit in the present aspect can detect the direction of the communication partner based on a communication direction when communication by millimeter wave communication is established. The millimeter wave communication has high straightness, and hence it can be determined that the communication direction when the communication is established is the direction in which the communication partner is present.

In addition, the detection unit in the present aspect may detect the direction of the communication partner based on position information on the communication partner received through communication. In the case where the position information is transmitted from the communication partner, the detection unit can determine the direction of the communication partner from the received position information and position information on the host vehicle. The communication through which the position information is transmitted may be the millimeter wave communication or communication other than the millimeter wave communication. Examples of the communication other than the millimeter wave communication include 3G or 4G mobile telephone communication, a wireless LAN (IEEE 802.11a/b/g/n), DSRC, WAVE (IEEE 802.11p), and 700 MHz band intelligent transport systems (ARIB STD-T109).

Further, the detection unit in the present aspect may detect the direction of the communication partner based on sensor information obtained from a sensor mounted on the host vehicle. An example of the sensor includes a camera, and the direction of the communication partner (e.g., a vehicle or a roadside communication device) is determined by detecting the communication partner by image processing. In addition, as the sensor, for example, a radar and a laser sensor may also be used.

In the case where the communication partner is a roadside communication device (fixed communication device), the detection unit may detect the direction of the communication partner based on pre-stored installation information including an installation position and a communication direction of a roadside communication device. Herein, the "pre-stored" means "stored before the communication direction is detected". The installation information may be acquired via, e.g., communication or a recording medium before the running of the vehicle is started and stored in the vehicle-mounted millimeter-wave communication device, or may also be acquired via communication (not limited to the millimeter wave communication) during running of the vehicle and stored in the vehicle-mounted millimeter-wave communication device.

Note that the present invention can be viewed as a vehicle-mounted millimeter-wave communication device that includes at least part of the above units. The present invention can also be viewed as a radio communication method that executes at least part of the above processes. In addition, the present invention can also be viewed as a computer program for causing a computer to execute the method, or a computer-readable storage medium in which the computer program is stored non-transitorily. The above-described units and processes can be adopted in combination, where feasible, to constitute the present invention.

According to the present invention, it is possible to implement the efficient millimeter wave communication in the vehicle.

BRIEF DESCRIPTION OF THE DRAWINGS

FIGS. 2A to 2C are views for explaining the configuration of an antenna in the first embodiment;

FIG. 4 is a flowchart showing procedures of a communication control process in the first embodiment;

FIGS. 7A to 7D are views for explaining examples of the communication time allocation in the first embodiment;

DESCRIPTION OF THE EMBODIMENTS

First Embodiment

The present embodiment relates to a vehicle-mounted millimeter-wave communication device that performs communication by using millimeter waves. In the present specification, the "millimeter waves" mean radio waves in a band from 24 GHz to 86 GHz. The millimeter wave has high straightness, and hence it is necessary to appropriately control a communication direction. In particular, a positional relationship with a communication partner frequently changes in a vehicle environment. The present embodiment uses a communication device and a communication method suitable particularly for such a vehicle environment.

Configuration

Figure 1:
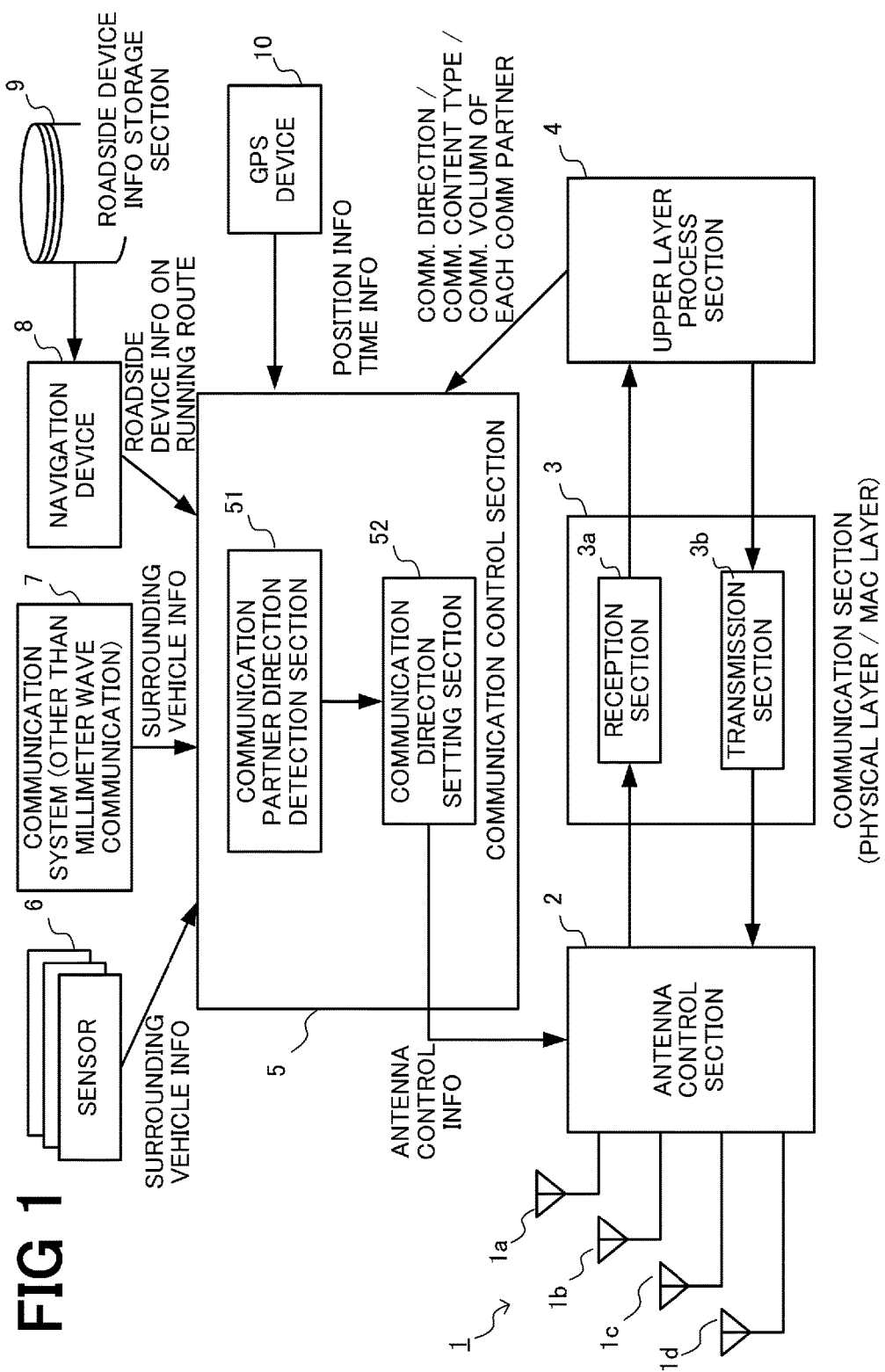
FIG. 1 is a block diagram showing the configuration of a vehicle-mounted millimeter-wave communication device according to a first embodiment.

FIG. 1 is a view showing the configuration of the vehicle-mounted millimeter-wave communication device of the present embodiment. As shown in FIG. 1, the vehicle-mounted millimeter-wave communication device according to the present embodiment includes an antenna unit 1, an antenna control section 2, a communication section 3, an upper layer process section 4, and a communication control section 5. The communication control section 5 is configured to be capable of acquiring information from various sensors 6, a communication system 7 for communication other than millimeter wave communication, a navigation device 8, and a GPS device 10 in addition to the upper layer process section 4.

In the present embodiment, the antenna unit 1 includes four fixed patch antennas 1a to 1d. Although the directivity of each patch antenna is fixed, the communication direction (directivity) of the entire antenna unit can be changed by switching of the patch antennas to be used. The vehicle-mounted millimeter-wave communication device performs communication while changing the communication direction based on time-sharing by temporally changing the antenna to be used using the antenna control section 2.

As shown in FIG. 2A, the antenna unit 1 is installed on a roof of a vehicle, and the four patch antennas 1a to 1d are installed to be directed in forward, backward, left, and right directions. Each of the patch antennas 1a to 1d covers an angle range of 90 degrees.

FIG. 2B shows the configuration of the antenna unit 1 more specifically. The patch antennas 1a to 1d have antenna feeding points 11a to 11d respectively, and the antenna control section 2 can control the selection of the antenna to be turned ON by switching the selection of the antenna feeding point 11 connected to a contact 12 of the communication device. Although the directivity of each patch antenna is fixed, it is possible to change allocation of a communication time of each communication direction by adjusting a selection time period of each patch antenna in the switching control by the antenna control section 2. The switching control of the antenna may be performed using a physical switch, or may also be performed using an electronic switch (an electric or electronic circuit).

While an example in which the four patch antennas are used has been described in each of FIGS. 2A and 2B, eight patch antennas may also be used such that each patch antenna covers an angle range of 45 degrees, as shown in FIG. 2C. In addition, the same effect can be obtained by installing the patch antennas 1a to 1d at the front, rear, left, and right of the vehicle instead of installing them on the roof, as shown in FIGS. 3A and 3B.

Figure 3C:
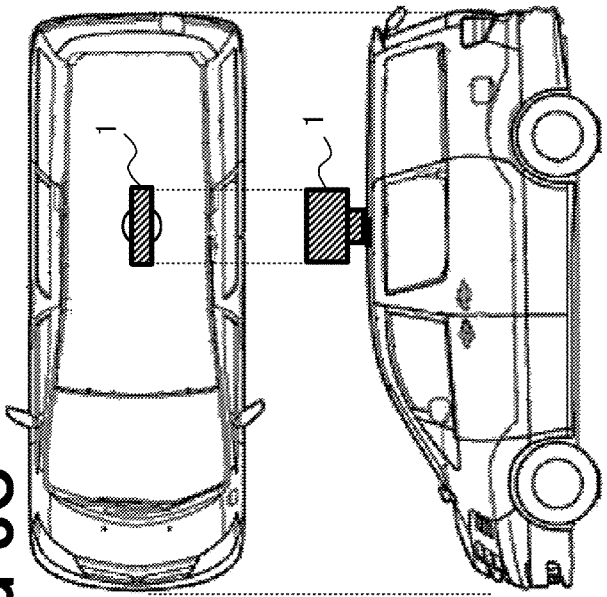
FIGS. 3A to 3D are views for explaining modifications of the configuration of the antenna.
Figure 3D:
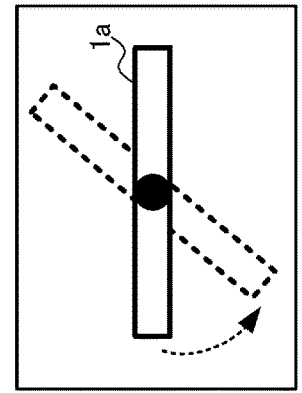
Figure 3A:
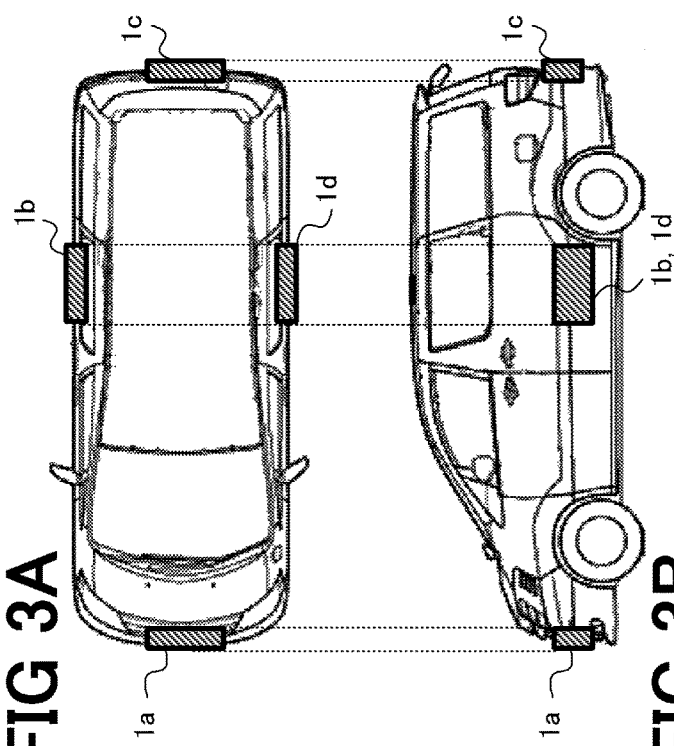
Figure 3B:
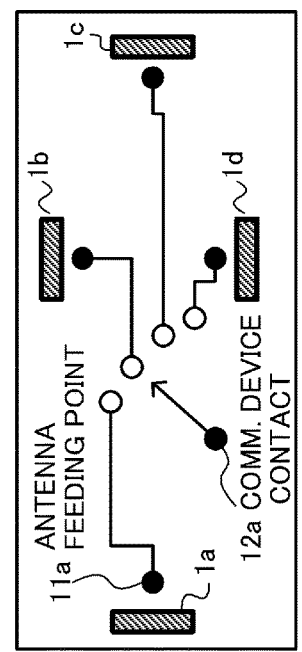

Further, as shown in FIGS. 3C and 3D, communication in each direction may be implemented by installing a rotary antenna on the roof of the vehicle and physically rotating the patch antenna on a horizontal plane in accordance with instructions from the antenna control section 2. The number of directions in which the communication can be performed during any time period is one, but the communication time of each direction can be adjusted by controlling a rotation speed. Furthermore, by making the rotation speed in a specific direction lower than in other directions, it is possible to increase the communication time of the specific direction.

Additionally, the communication direction may be changed temporally by using an adaptive antenna having beamforming capability as the antenna unit 1 and adjusting the directivity thereof.

The communication section 3 performs, among processes related to the communication, processes related to the physical layer and the MAC layer. The communication section 3 includes a reception section 3a and a transmission section 3b. The reception section 3a performs a received radio wave process (down-conversion, analog/digital (A/D) conversion, or the like) and demodulation on a radio signal received in a reception band via the antenna unit 1, and outputs the obtained signal to the upper layer process section 4. The transmission section 3b performs modulation and a transmitted radio wave process (up-conversion, digital/analog (D/A) conversion, or the like) on a signal generated by the upper layer process section 4, and transmits the signal via the antenna unit 1. The communication section 3 performs transmission and reception during a time slot determined by the communication control section 5. In the present embodiment, time synchronization is basically performed based on GPS time (absolute time) obtained from the GPS device 10.

The upper layer process section 4 performs protocol processes at layers above the MAC layer. Consequently, the upper layer process section 4 can determine a communication content type (e.g., communication related to vehicle control, communication related to entertainment, or communication related to road safety) of each communication partner based on received data received from the communication partner.

In addition, based on the received data received from the communication partner, the upper layer process section 4 transmits a large-volume communication request for notifying the communication partner that it is necessary to perform large-volume communication to the communication partner, or acquires the large-volume communication request from the communication partner. The reference of the large-volume communication may be determined according to whether or not a communication volume is not less than a threshold value. The threshold value may be determined appropriately, and it is preferable to set the threshold value to the communication volume that is considered to require allocation of a long communication time to complete the communication.

Further, the upper layer process section 4 may notify the communication partner of position information on a host vehicle, or acquire the position information from the communication partner. Furthermore, the upper layer process section 4 can recognize the direction of the communication partner that is viewed from the host vehicle based on the communication direction when the millimeter wave communication is established.

The communication control section 5 controls overall processes related to the millimeter wave communication. Herein, the allocation (setting) of the communication time to each communication direction will be mainly described. The communication control section 5 has sub-functional sections of a communication partner direction detection section 51 and a communication direction setting section 52 in connection with communication time allocation control.

The communication partner direction detection section 51 (hereinafter referred to as a direction detection section 51) detects the direction of the communication partner (millimeter-wave communication device) present around the host vehicle that is viewed from the host vehicle. The direction detection section 51 detects the direction of the communication partner based on surrounding vehicle information and roadside device installation information obtained from, for instance, the communication section 3, the upper layer process section 4, the sensors 6, the communication system 7, and the navigation device 8.

For example, the direction detection section 51 can detect that the communication partner is present in the communication direction of the antenna selected when the millimeter wave communication is established based on the notification from the communication section 3 or the upper layer process section 4. Alternatively, the direction detection section 51 may detect the direction of the communication partner based on sensor information obtained from the sensors 6. Examples of the sensors 6 include a camera, a radar, and a laser mounted on a vehicle. The direction detection section 51 detects the surrounding vehicle or roadside communication device (roadside device) by performing image recognition processing on an image taken by the camera, and determines that the direction thereof is the direction of the communication partner. Additionally, the direction detection section 51 may also detect the communication partner using the radar or a laser sensor.

In addition, the direction detection section 51 may detect the direction of the communication partner based on information obtained from the communication system 7 for communication other than the millimeter wave communication. The communication system 7 is a communication system that uses a wireless LAN (IEEE 802.11a/b/g/n), DSRC, WAVE (IEEE 802.11p), and 700 MHz band intelligent transport systems (ARIB STD-T109). In the case where the position information on the communication partner is obtained from the communication system 7, the direction detection section 51 detects the direction of the communication partner based on these pieces of information, and the position information and a running direction of the host vehicle obtained from the GPS device 10.

Further, the direction detection section 51 detects the direction of the communication partner (the roadside device in this case) based on the roadside device installation information on a running route obtained from the navigation device 8. The navigation device 8 can recognize the running route of the host vehicle, and hence the navigation device 8 accesses a roadside device installation information storage section 9 to acquire the installation position and the communication direction of the roadside device installed on the running route of the host vehicle. It is possible to determine the direction of the roadside device based on these pieces of information. Furthermore, it is also possible to predict the direction of the roadside device at some point in the future based on the predicted position of the host vehicle at some point in the future.

The communication direction setting section 52 determines the setting of the communication direction of the host vehicle based on the direction of the communication partner obtained from the direction detection section 51. A specific determination method will be described later with reference to a flowchart. The communication direction setting section 52 determines the temporal allocation of the communication direction, and outputs the determined temporal allocation thereof to the antenna control section 2 as antenna control information. The antenna control section 2 controls the antenna unit 1 according to the antenna control information to thereby switch the communication direction of each time. The communication partner is also determined by the determination of the communication direction. Consequently, the communication direction setting section 52 supplies information related to the communication partner of each time (each time slot) to the transmission section 3b such that the transmission section 3b can select the time slot and the communication partner to which the information is to be transmitted during the time slot.

Each functional section described above may be implemented by an electric or electronic circuit, or may also be implemented by execution of a program stored in a storage device by a central processing unit (CPU), a digital signal processor (DSP), or a field programmable gate array (FPGA). That is, the vehicle-mounted millimeter-wave transmission device according to the present embodiment may be implemented by a combination of a computer and software, may be implemented by a hardware circuit, or may also be implemented by a combination thereof.

The sensors 6, the communication system 7, and the navigation device 8 are described above, and hence the repeated description thereof will be omitted.

The roadside device installation information storage section 9 stores the installation position and the communication direction of the roadside device (collectively referred to as roadside device installation information). The roadside device installation information may be acquired by any method. For example, the roadside device installation information can be acquired via a storage medium or radio communication, and stored in the storage section 9. In particular, the roadside device installation information may be acquired by using the millimeter wave communication or other communication systems during running of the vehicle.

The GPS device 10 is used to acquire the position information on the vehicle and the current time. Note that it is possible to use any position information acquisition device and any time information acquisition device other than the GPS device as long as the devices can acquire the same information. For example, as the position information acquisition device, a positioning device that uses a satellite positioning system other than GPS (a global navigation satellite system such as Galileo, GLONASS, or Compass, or a regional navigation satellite system such as BDS or DORIS), or a base station positioning device may be used.

Process

FIG. 4 is a flowchart showing a communication control process in the present embodiment. The process shown in FIG. 4 is repeatedly executed every predetermined time (e.g., 1 second, 3 seconds, or 5 seconds).

In Step S101, the communication control section 5 acquires information related to the surrounding communication partner (e.g., the vehicle or the roadside device), and the direction detection section 51 detects the direction of the communication partner (in the case where the communication partner is present).

In Step S102, the communication direction setting section 52 determines whether or not the communication partner is present around the host vehicle. In the case where the communication partner is present around the host vehicle (S102—YES), the process proceeds to Step S103, and the communication direction setting section 52 set a long communication time for the direction in which the communication partner is present, and communication is performed. In the case where the communication partner is not present around the host vehicle (S102—NO), the process proceeds to Step S104, the communication direction setting section 52 allocates communication times that are equal to each other to all directions, and the communication is performed.

In Step S105, the communication is performed during a predetermined time by using the communication time allocation set in Step S103 or S104. When the predetermined time elapses, the procedures from Step S101 are repeatedly executed. Note that the position of the host vehicle and information on a running environment are updated at any time during the execution of the communication based on the set communication time allocation.

Operation Example

The communication time allocation in each of Steps S103 and S104 will be described in detail based on specific operation examples shown in FIGS. 5 to 7.

Figure 5:
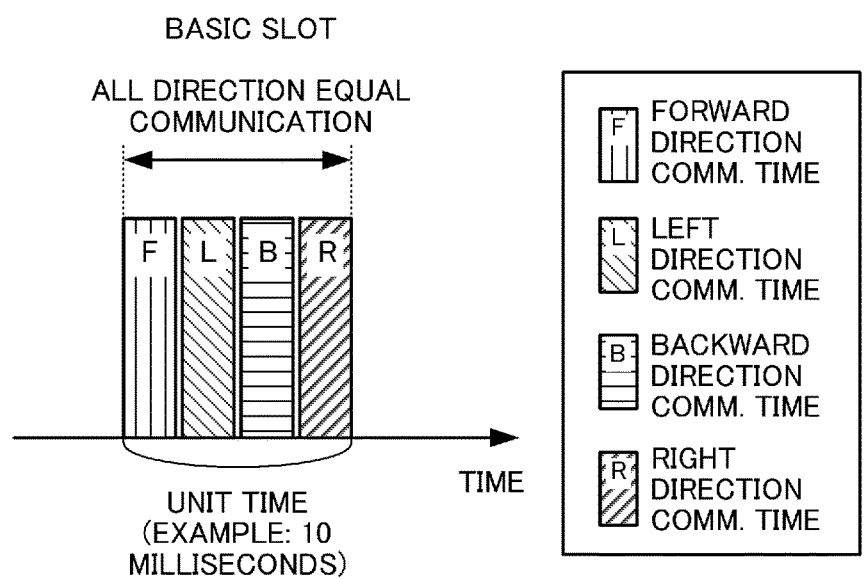
FIG. 5 is a view for explaining an example of communication time allocation in the first embodiment.

FIG. 5 is a view for explaining the case where the communication times that are equal to each other are allocated to all communication directions (the procedure in Step S104). Herein, a description will be made by using 10 milliseconds as one unit time (communication cycle). In the case where the communication times that are equal to each other are allocated to all directions, 10 milliseconds serving as the unit time is quartered, and 2.5 milliseconds is allocated to each of forward, backward, left, and right directions as the communication time. By using this basic slot repeatedly, it is possible to obtain communication opportunities equally with communication partners in all directions.

Figure 6A:
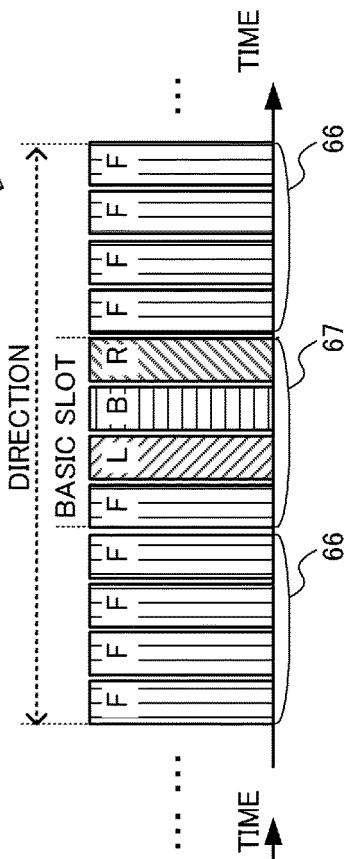
FIGS. 6A to 6D are views for explaining examples of the communication time allocation in the first embodiment.
Figure 6C:
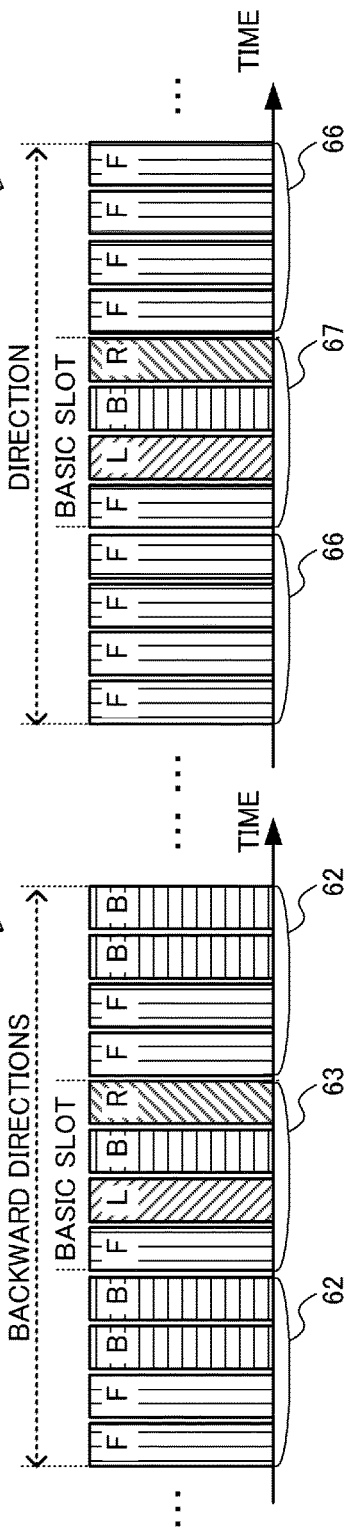
Figure 6B:
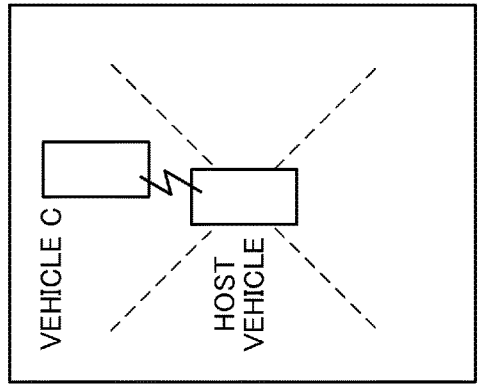

FIGS. 6A to 6D are views for explaining the case where the long communication time is allocated to the communication direction of the communication partner (the procedure in Step S103). FIG. 6A is a view showing the allocation of the communication time in the case where the communication partners (a vehicle A and a vehicle B) are present in the forward and backward directions of the host vehicle, as shown in FIG. 6B. Herein, an allocation time period 61 consisting of three unit time periods 62, 63, and 62 is used as one unit, and the communication is performed by repeating the unit. In this case, since the communication partners are present in the forward and backward directions of the host vehicle, the communication direction setting section 52 sets the communication times only for the forward and backward directions during the time period 62. Specifically, 5 milliseconds is allocated to the communication in each of the forward and backward directions equally. During the next time period 63, the communication times that are equal to each other are allocated to all directions. As a whole, when the communication partner is present around the host vehicle, the communication is controlled such the time period 62 during which the long communication time is set for the direction of the communication partner and the communication is performed, and the time period 63 during which the communication times that are equal to each other are set for all directions and the communication is performed are alternately set.

Figure 6D:
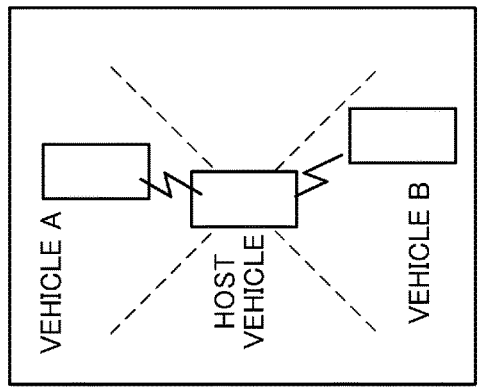

FIG. 6C is a view showing the allocation of the communication time in the case where one vehicle (a vehicle C) is present in the forward direction of the host vehicle, as shown in FIG. 6D. In this example, an allocation time period 65 consists of a time period 66 during which the communication time is allocated only to the forward direction, and a time period 67 during which the communication times that are equal to each other are allocated to all directions.

Thus, in the present embodiment, the time period (62 or 66) during which the communication time is allocated only to the direction in which the communication partner is present, and the time period (63 or 67) during which the communication times that are equal to each other are allocated to all directions are alternately combined. With this, as a whole, it is possible to allocate the communication time longer than those allocated to the other directions to the direction in which the communication partner is present. It is possible to perform communication having a larger communication volume in a short time by allocating the long communication time to the direction in which the communication partner is present, and it is possible to keep the communication with the other communication partners (new communication partners) by allocating the communication times to the other directions.

A time ratio between the time period during which the communication time is allocated to the direction in which the communication partner is present and the time period during which the communication times that are equal to each other are allocated to all directions is 2 to 1 in the above example, but any ratio other than the above ratio may be set. The time periods may be set to be equal to each other, and the time period of the equal allocation may be set to be longer than the other time period.

FIGS. 7A to 7D are views for explaining the case where the roadside device is the communication partner. FIG. 7A is a view showing the allocation of the communication time in the case where, as shown in FIG. 7B, the presence of a roadside device 74 on the left side of a road on which the vehicle is running can be grasped from the roadside device installation information. In this example, an allocation time period 71 consists of a time period 72 during which the communication time is allocated only to the left direction, and a time period 73 during which the communication times that are equal to each other are allocated to all directions, and, as a whole, the long communication time is allocated to the left direction.

FIG. 7C is a view showing the allocation of the communication time in the case where a roadside device 78 is present on the right side of the host vehicle and a vehicle A is present in the backward direction of the host vehicle, as shown in FIG. 7D. In this example, an allocation time period 75 consists of a time period 76 during which the communication times are allocated only to the backward direction and the right direction, and a time period 77 during which the communication times that are equal to each other are allocated to all directions and, as a whole, the long communication times are allocated to the backward direction and the right direction.

Advantageous Effect of Present Embodiment

According to the present embodiment, in the communication that uses the millimeter wave having high straightness, it becomes possible to perform large-volume communication in a short time by allocating the longer communication time to the direction in which the communication partner is present, and it is possible to keep the communication in the other directions. That is, it is possible to increase the throughput of the communication with the actual communication partner with which the communication is established while allowing the communication with the communication partners (including potential communication partners) present in all directions, and it becomes possible to obtain both of high efficiency and high availability.

To allow the communication in all direction, it is possible to provide the antenna and a radio communication process section in each communication direction, but this arrangement increases the number of the radio communication process sections and cost. In the present embodiment, by handling the communication in each direction based on time-sharing by using one radio communication process section (communication section), it is possible to prevent an increase in cost.

Second Embodiment

Figure 8:
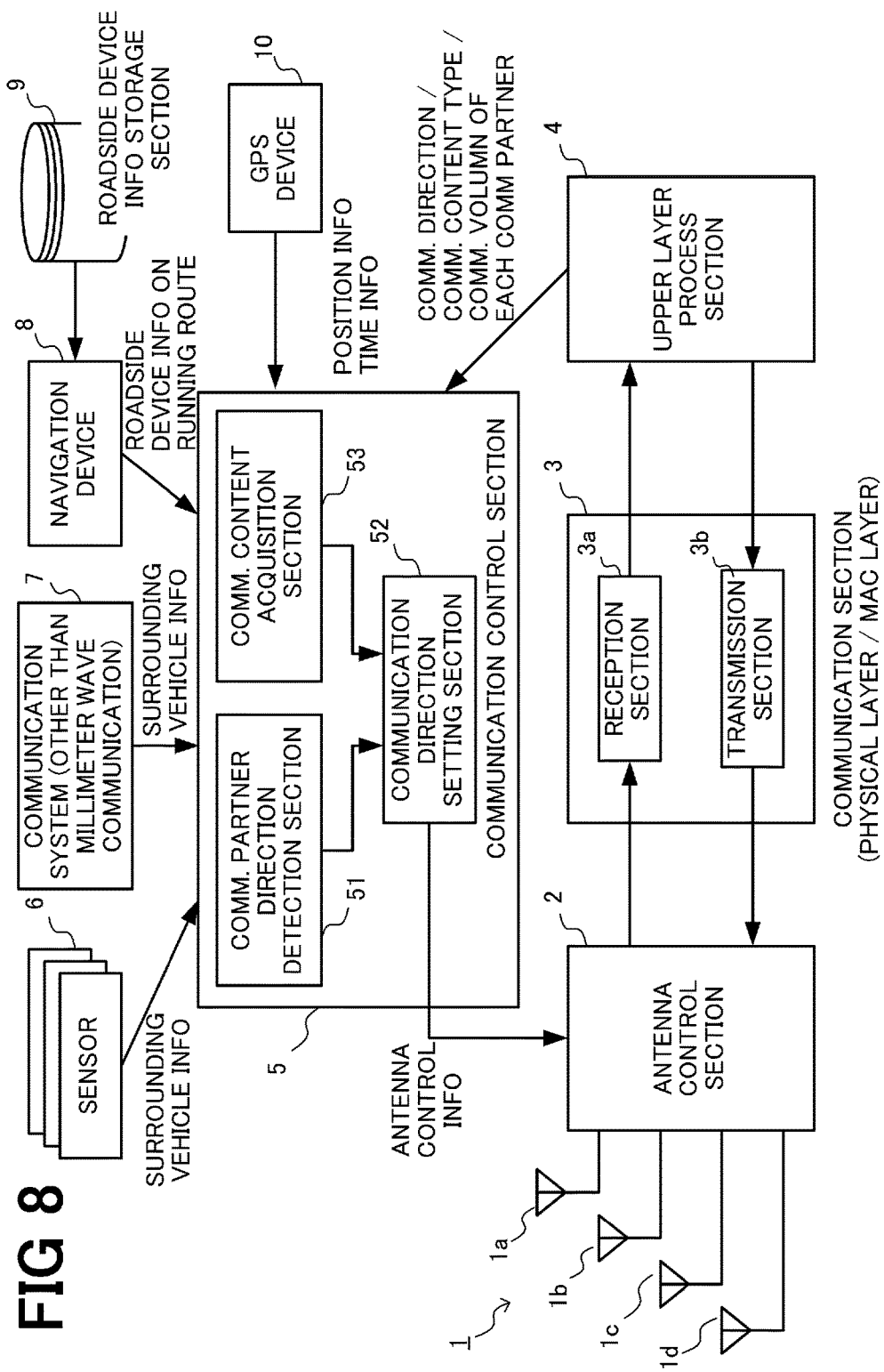
FIG. 8 is a block diagram showing the configuration of a vehicle-mounted millimeter-wave communication device according to a second embodiment.

FIG. 8 is a view showing the configuration of a vehicle-mounted millimeter-wave communication device according to a second embodiment. The same components as those in the first embodiment are designated by the same reference numerals, and the repeated description thereof will be omitted.

The present embodiment is different from the first embodiment in that a communication content acquisition section 53 is provided in the communication control section 5. The communication content acquisition section 53 is the functional section that acquires details of the communication of the vehicle-mounted millimeter-wave communication device with the communication partner.

An example of the communication content acquired by the communication content acquisition section 53 is information indicative of the kind of information transmitted to or received from the communication partner using the millimeter wave communication, i.e., information indicative of the type of the communication content. Examples of the type of the communication content include communication related to control of a vehicle, communication related to traffic information, and communication related to entertainment. In addition, the importance or urgency of communication may be used as the communication content type. In the present embodiment, the communication content type is stored in, e.g., transmitted data and transmitted when the millimeter wave communication is performed. Consequently, the upper layer process section 4 can interpret the communication content type of each communication partner, and the communication content acquisition section 53 acquires the communication content type from the upper layer process section 4.

Another example of the communication content acquired by the communication content acquisition section 53 is information indicative of the communication volume that is the volume of the communication with the communication partner performed using the millimeter wave communication. The communication volume may be specified numerically, or may also be specified according to whether or not the communication volume is not less than a threshold value. In the present embodiment, the communication content acquisition section 53 acquires information indicative of the communication volume of each communication partner from the upper layer process section 4. In the present embodiment, when the communication having the communication volume of not less than a predetermined threshold value is performed, the large-volume communication request serving as a request for the large-volume communication is transmitted. Consequently, the upper layer process section 4 can recognize the request for the large-volume communication made by the communication partner. In addition, the upper layer process section 4 can also recognize the necessity for the host vehicle to perform the large-volume communication.

Figure 9:
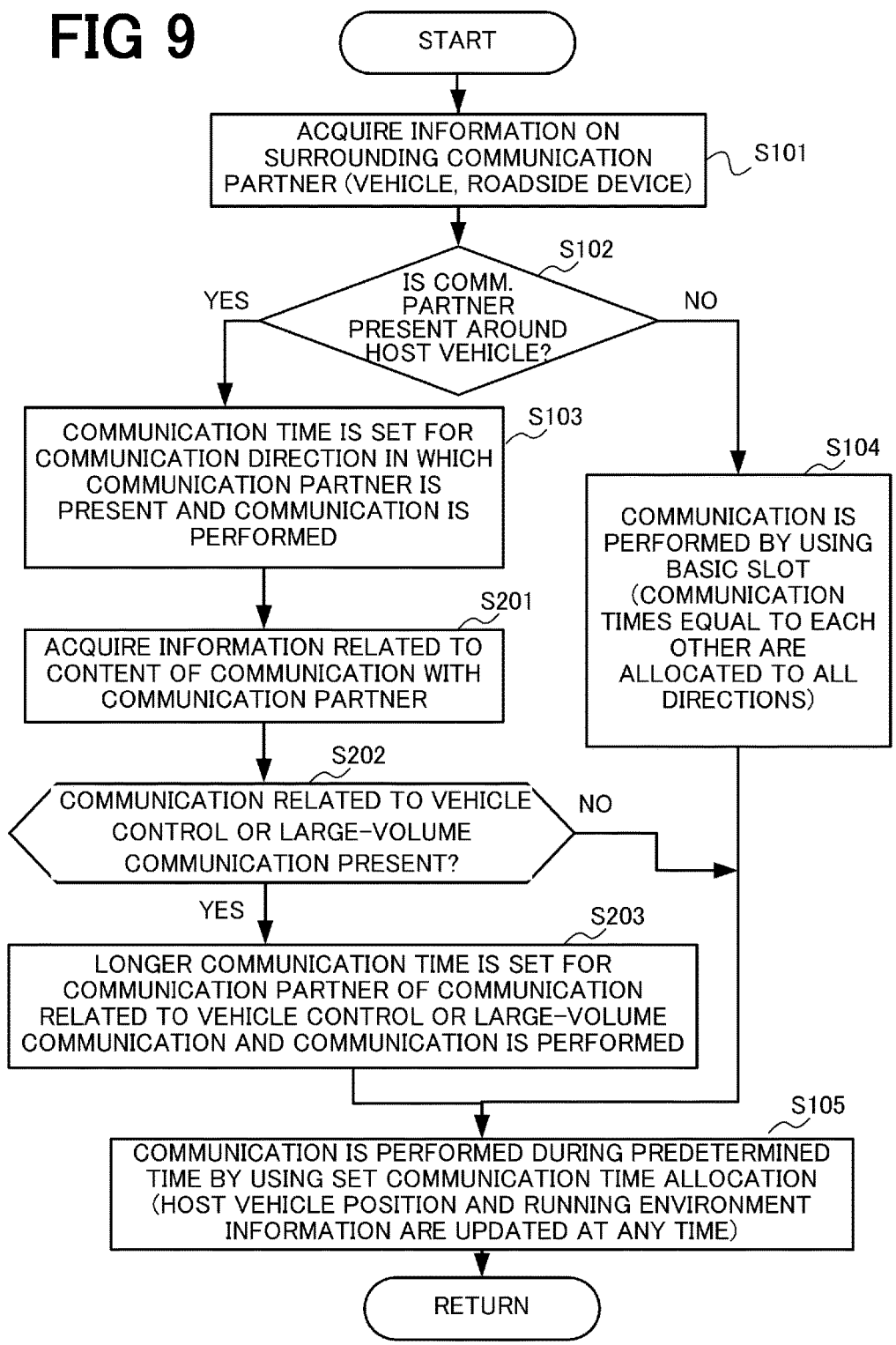
FIG. 9 is a flowchart showing procedures of a communication control process in the second embodiment.

FIG. 9 is a flowchart showing a communication control process in the present embodiment. The same procedures as those in the process (FIG. 4) in the first embodiment are designated by the same reference numerals, and the repeated description thereof will be omitted. The present embodiment is different from the first embodiment in that procedures in Steps S201 to S203 are added after Step S103.

Similarly to the first embodiment, the long communication time is set for the communication direction in which the communication partner is present and the communication is performed (S103) in the case where the communication partner is present around the host vehicle (S102—YES). The vehicle-mounted millimeter-wave communication device performs the communication in accordance with the communication setting in Step S103, and the communication content acquisition section 53 acquires the information related to the content of the communication with the communication partner in Step S201. In Step S202, the communication content acquisition section 53 determines whether or not at least one of a condition that the type of the content of the communication with the communication partner is related to the control of the vehicle and a condition that the volume of the communication with the communication partner is not less than the threshold value is satisfied.

In the case where neither of the conditions in Step S202 is satisfied (S202—NO), the process proceeds to Step S105, and the communication is continued by using the communication time allocation set in Step S103.

In the case where one of the conditions in Step S202 is satisfied (S202—YES), the process proceeds to Step S203, and the communication direction setting section 52 sets the longer communication time for the communication partner of the communication related to the vehicle control or the communication partner of the large-volume communication, and the communication is performed.

With reference to FIGS. 10A to 10D, the communication control in the present embodiment will be described in detail based on specific operation examples.

Figure 10A:
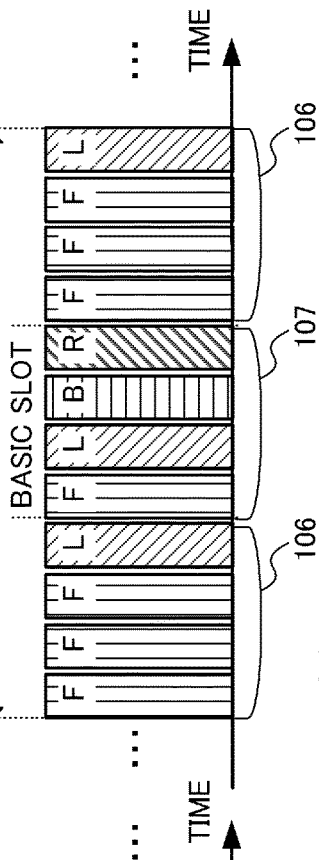
FIGS. 10A to 10D are views for explaining examples of communication time allocation in the second embodiment.
Figure 10C:
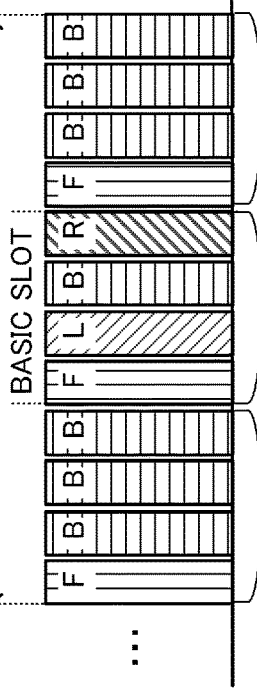
Figure 10B:
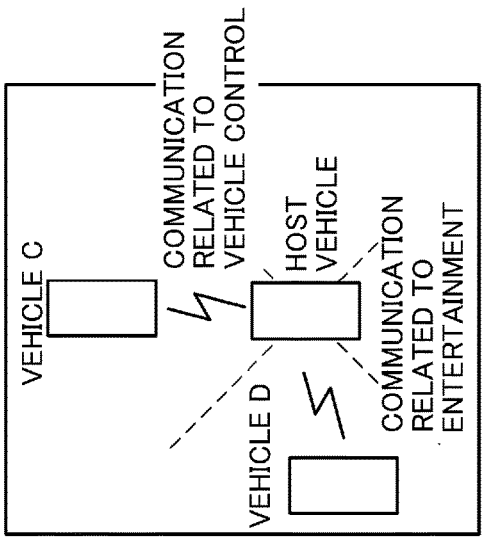

FIG. 10A is a view showing the allocation of the communication time in the case where the communication partners (a vehicle A and a vehicle B) are present in the forward and backward directions of the host vehicle and the large-volume communication request is received from the vehicle B in the backward direction, as shown in FIG. 10B. An allocation time period 101 consists of a time period 102 during which the communication times are allocated only to the forward direction and the backward direction, and a time period 103 during which the communication times that are equal to each other are allocated to all directions. During the time period 102, the communication times are allocated only to the forward direction and the backward direction, and the longer communication time is allocated to the vehicle B in the backward direction that performs the large-volume communication. With this allocation, as a whole, the longest communication time is allocated to the backward direction in which the large-volume communication is performed, the second longest communication time is allocated to the forward direction in which the communication partner is present, and the communication times are also allocated to the other directions (left and right directions).

Figure 10D:
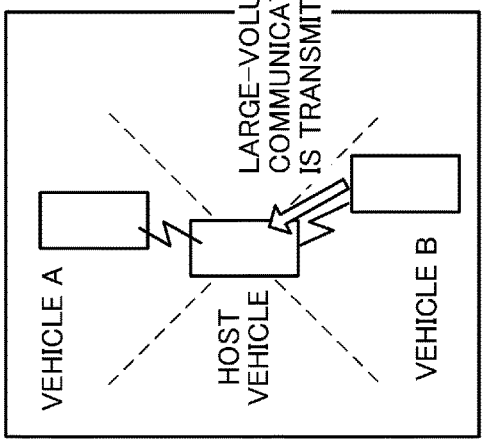

FIG. 10C is a view showing the allocation of the communication time in the case where the communication partners (a vehicle C and a vehicle D) are present in the forward direction and the left direction of the host vehicle, the communication related to the vehicle control is performed with the vehicle C in the forward direction, and the communication related to the entertainment is performed with the vehicle D in the left direction, as shown in FIG. 10D. An allocation time period 105 consists of a time period 106 during which the communication times are allocated only to the forward direction and the left direction, and a time period 107 during which the communication times that are equal to each other are allocated to all directions. During the time period 106, the communication times are allocated only to the forward direction and the left direction, and the longer communication time is allocated to the vehicle C in the forward direction that performs the communication related to the vehicle control. With this allocation, the longest communication time is allocated to the forward direction in which the communication related to the vehicle control is performed, the second longest communication time is allocated to the left direction in which the communication partner is present, and the communication times are also allocated to the other directions (right and backward directions).

According to the present embodiment, in addition to the effect of the first embodiment, it is possible to allocate a further longer communication time to the direction in which the communication partner that needs the further longer communication time is present. That is, it is possible to implement more efficient communication.

In the flowchart in FIG. 9, with regard to the communication content type, the long communication time is allocated only in the case of the communication related to the vehicle control, but the long communication times may be allocated to the other communication content types. In addition, the control is not limited to the control that determines whether or not the long communication time is allocated as in the flowchart in FIG. 9, but the control may be performed such that the length of the allocated communication time is switched according to the communication content type. To implement such control, an importance score may be set for each communication content type, and the allocation of the communication time corresponding to the ratio of the importance score may be performed. Specifically, When the score "2" is allocated to the communication related to the vehicle control, and the score "1" is allocated to the communication related to the traffic information, it is possible to allocate the communication time at a ratio of 2 to 1 during the time period during which the communication time is variable.

In addition, in the flowchart in FIG. 9, the communication volume is classified into two levels indicating whether or not the communication volume is large by using one threshold value. However, a plurality of degrees (levels) of the large-volume communication may be set by using a plurality of threshold values, and the communication time may be allocated by using the score of each level.

Further, in the present embodiment, it is also possible to determine overall importance in consideration of evaluations of both of the communication content type and the communication volume, and determine the allocation of the communication time to the communication partner. Typically, the longest communication time is allocated to the communication that has the important communication content type and a large communication volume. Conversely, the short communication time is allocated to the communication of which the communication content type is not important and that has a small communication volume. In the case where only one of the communication content type and the communication volume satisfies the condition, the same importance may be given to each of the communications. Alternatively, the higher importance may be given to one of the communications, and the longer communication time may be allocated to the communication. When the importance score of the communication is set for each of the communication content type and the communication volume, and the communication time is allocated in accordance with the sum total of the two importance scores, it becomes possible to perform the communication time setting in which these two elements are reflected.

Others

In the embodiments described above, an example in which the antennas directed in four or eight directions are switchably used, and an example in which the antenna is rotated have been described. However, it is possible to adopt configurations other than the above configurations. In the case where a plurality of the antennas are used, the number of the antennas is not limited to four or eight, and the number thereof may be more than or less than four or eight. In addition, the directivity may be switched by using an adaptive antenna capable of changing the directivity by beamforming. Further, the communication direction may be changed by using both of switching of the antenna to be used and beamforming by using a plurality of the adaptive antennas that are directed in different directions.

In addition, in the above description, the communication time allocation is determined by using the communication time period of 10 milliseconds consisting of four slots each having 2.5 milliseconds as one unit, but the determination of the communication time allocation is not limited to the above mode. The allocation of the communication time may be changed by using a longer unit.

The present invention can be appropriately modified and implemented without departing from the scope of the technical idea of the invention.

What is claimed is:

1. A vehicle-mounted millimeter-wave communication device for performing communication while temporally changing a communication direction, the communication device comprising:
   an antenna capable of changing directivity and communicating with only one communication direction at a time;
   a detection unit configured to detect a direction of a communication partner present around a host vehicle, wherein the direction is given as a direction from the host vehicle to the communication partner; and
   a communication control unit configured to determine an allocation of the communication direction in a predetermined period, and perform control such that communication is performed, in which a longer communication time is allocated for the direction of the communication partner than another direction.

2. The vehicle-mounted millimeter-wave communication device according to claim 1, further comprising:
   a communication type acquisition unit configured to acquire a type of a content of communication with the communication partner,
   wherein the communication control unit performs control that sets a long communication time for the direction of the communication partner in a case where the type of the content of the communication with the communication partner is related to control of a vehicle.

3. The vehicle-mounted millimeter-wave communication device according to claim 1, further comprising:
   a communication volume acquisition unit configured to acquire a volume of communication with the communication partner,
   wherein the communication control unit performs control that sets a long communication time for the direction of the communication partner in a case where the volume of the communication with the communication partner is not less than a threshold value.

4. The vehicle-mounted millimeter-wave communication device according to claim 1, wherein the communication control unit performs control such that communication, in which a long communication time is set for the direction of the communication partner, and communication, in which equal communication times that are set for all directions, are performed alternately in a case where the communication partner is present around the host vehicle.

5. The vehicle-mounted millimeter-wave communication device according to claim 1, wherein the detection unit detects the direction of the communication partner, based on a communication direction when communication by millimeter wave communication is established.

6. The vehicle-mounted millimeter-wave communication device according to claim 1, wherein the detection unit detects the direction of the communication partner, based on position information on the communication partner received through communication.

7. The vehicle-mounted millimeter-wave communication device according to claim 1, wherein the detection unit detects the direction of the communication partner, based on sensor information obtained from a sensor mounted on the host vehicle.

8. The vehicle-mounted millimeter-wave communication device according to claim 1, wherein the detection unit detects the direction of the communication partner, based on pre-stored installation information including an installation position and a communication direction of a roadside communication device.

9. The vehicle-mounted millimeter-wave communication device according to claim 1, wherein:
   the antenna has a plurality of fixed antennas directed in different directions, and
   the communication control unit changes setting of a communication time of each direction by adjusting a selection time period when the plurality of fixed antennas are switchably used.

10. The vehicle-mounted millimeter-wave communication device according to claim 1, wherein:

the antenna has a rotary antenna, and the communication control unit changes setting of a communication time of each direction by adjusting a rotation speed of the rotary antenna.

11. A communication control method in a vehicle-mounted millimeter-wave communication device for performing communication while temporally changing a communication direction by using an antenna capable of changing directivity and communicating with only one communication direction at a time, the communication control method comprising:

detecting a direction of a communication partner present around a host vehicle, wherein the direction is given as a direction from the host vehicle;

determining an allocation of the communication direction in a predetermined period; and performing control such that communication is performed, in which a longer communication time is allocated for the direction of the communication partner than another direction.

12. A non-transitory computer-readable medium storing a program for causing a computer to execute the steps of the method according to claim 11.

\* \* \* \* \*